Oct. 7, 1969　　　　　A. BERGEZ　　　　　3,471,142
DEVICE FOR PILING SHEETS
Filed June 27, 1967　　　　　　　　　　7 Sheets-Sheet 1

INVENTOR.
Andre Bergez
BY
HIS ATTORNEYS

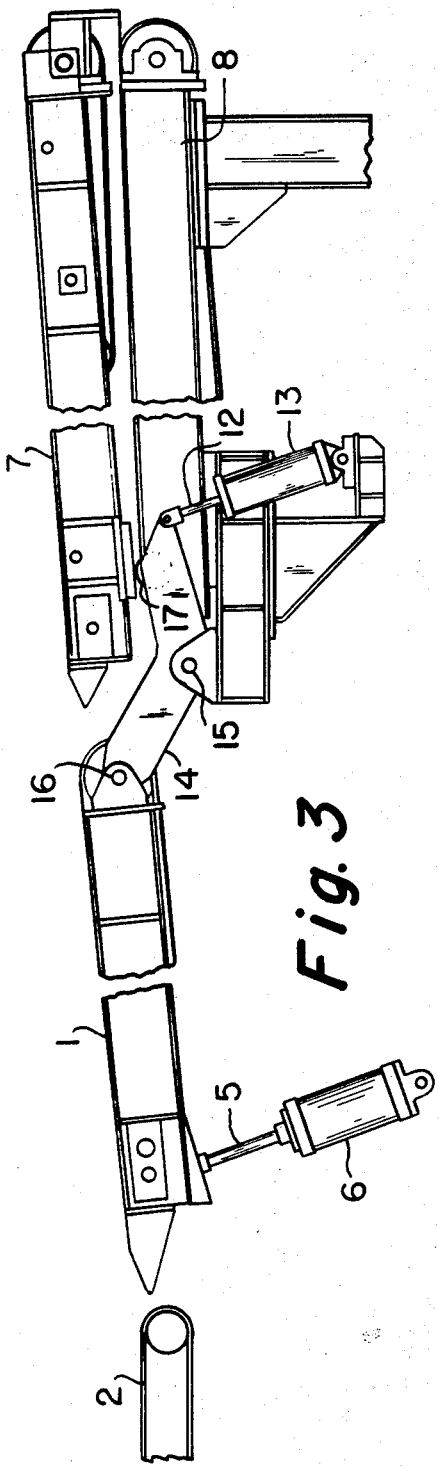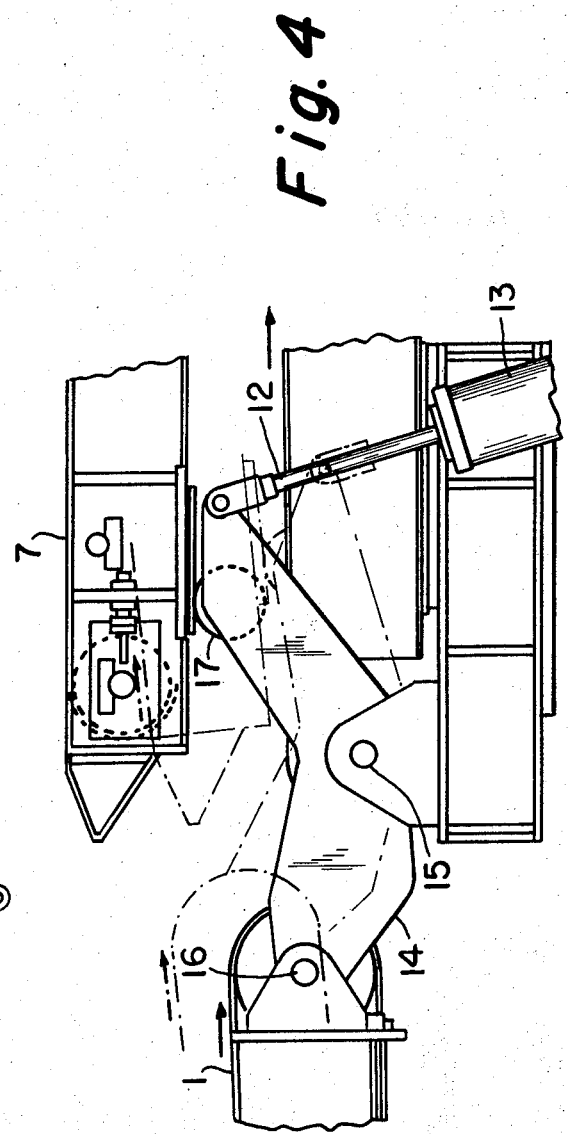

Oct. 7, 1969      A. BERGEZ      3,471,142
DEVICE FOR PILING SHEETS
Filed June 27, 1967      7 Sheets-Sheet 5

INVENTOR.
Andre Bergez
BY
HIS ATTORNEYS

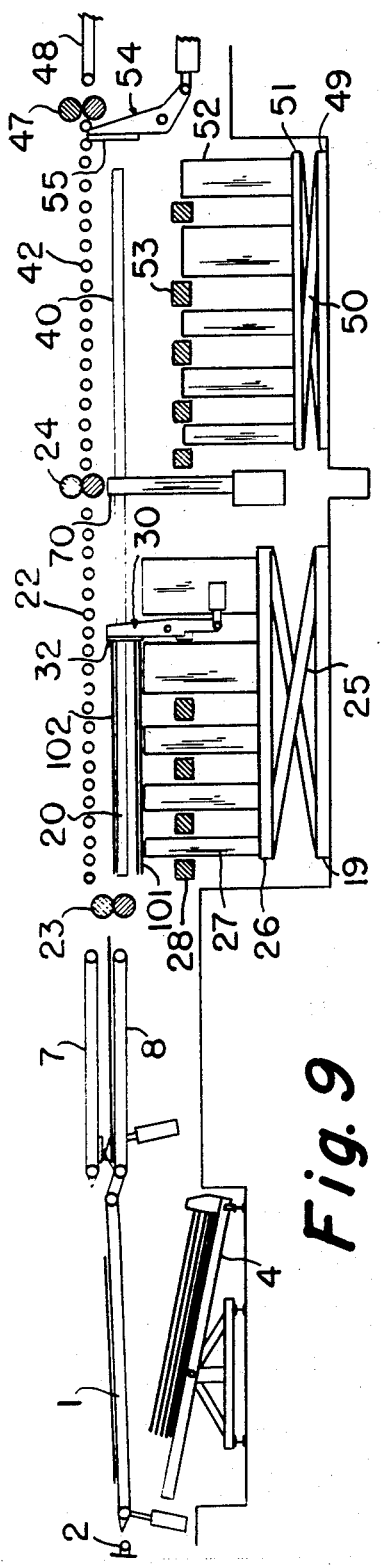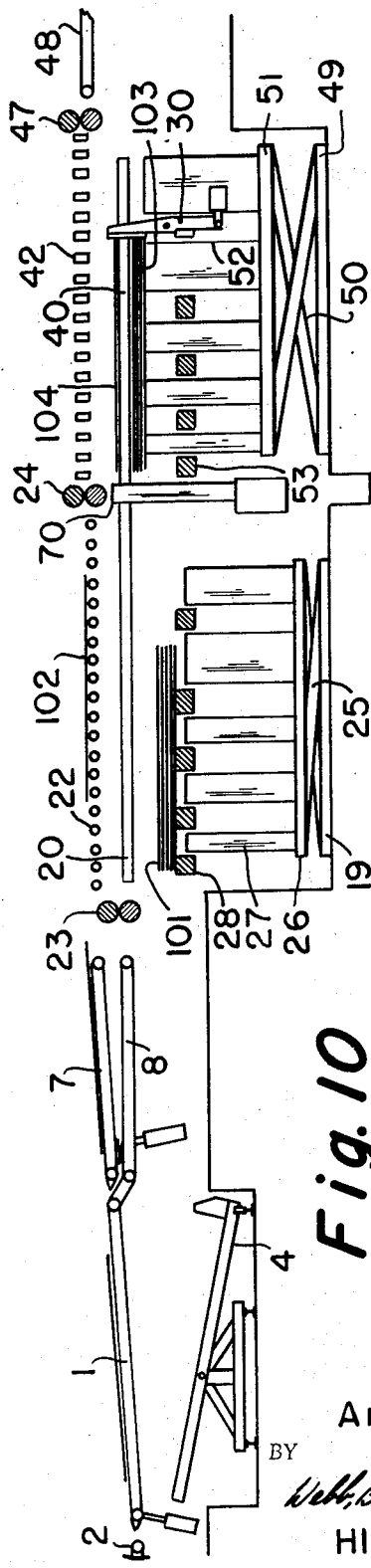

Oct. 7, 1969  A. BERGEZ  3,471,142
DEVICE FOR PILING SHEETS

Filed June 27, 1967  7 Sheets-Sheet 7

INVENTOR.
Andre Bergez
BY
HIS ATTORNEYS

United States Patent Office 3,471,142
Patented Oct. 7, 1969

3,471,142
DEVICE FOR PILING SHEETS
Andre Bergez, Paris, France, assignor to Société Anonyme
Wean-Damiron, Paris, France
Filed June 27, 1967, Ser. No. 653,593
Claims priority, application France, June 28, 1966,
67,332
Int. Cl. B65h 31/12, 29/58
U.S. Cl. 271—64                                   13 Claims

ABSTRACT OF THE DISCLOSURE

A device for piling sheets including two pilers located in tandem and operable either independently or simultaneously as a unit in accordance with the length of the sheets being piled and adjustable conveyers for supplying sheets to the individual pilers or to both pilers as a unit. Each piler including retractable runners for depositing individual sheets on an elevator to lower a pile of sheets onto transversely movable beams for removal of the pile from the piler, and the runners in the pilers being aligned to permit piling of sheets having a length greater than the length of the individual pilers.

---

This invention relates to a device for piling sheets of material and more particularly to a device which is adjustable to handle sheets of different lengths.

Conventional sheet piling devices are designed to receive sheets of a given length and it often happens that the length of the sheets is less than the length of the piler; and, therefore, the piler is not used to its full capacity. Alternatively, the sheets to be piled may be longer than the piler; and it is, therefore, not possible to use the piler at all. It is desirable to provide a piling device which may be adjusted to handle sheets of various lengths to eliminate the necessity of having a plurality of piling devices for piling sheets of different lengths. Since the piling device is often located at the end of a strip line after the shear, it should be capable of bypassing exceptionally long sheets and rapidly piling and discharging shorter sheets so as not to interrupt the strip line.

The piling device of my invention can be adjusted to pile sheets of different lengths and can handle sheets without interruption regardless of the length of the sheets. When necessary, the individual pilers may be operated as a unit to pile sheets having a length greater than the length of an individual piler. Alternatively, when relatively short sheets are to be piled, my device may be operated so that it is in effect a pair or individual pilers located in tandem; and this makes it possible to use one piler when the other piler is being emptied. The piling device is constructed so that a pile can be quickly removed therefrom and the piling device is immediately ready to receive another group of sheets.

My invention includes conveyers which supply the sheets to the piling device and means for rapidly removing the piles from beneath the pilers. The first piler includes an overhead roller conveyor having driven rollers to apply a positive force for moving sheets, and the second piler includes an overhead roller conveyor with non-driven rollers located in the same plane as the rollers of the first piler conveyor and which may be retracted into an inoperative position when required. By utilizing my novel piling device, it is possible to bypass extremely long sheets past the piler without interruption and to pile sheets of varying lengths without a separate piling device for each length. As a result of this arrangement, separate pilers are eliminated; and a substantial saving is obtained.

Figure 1:
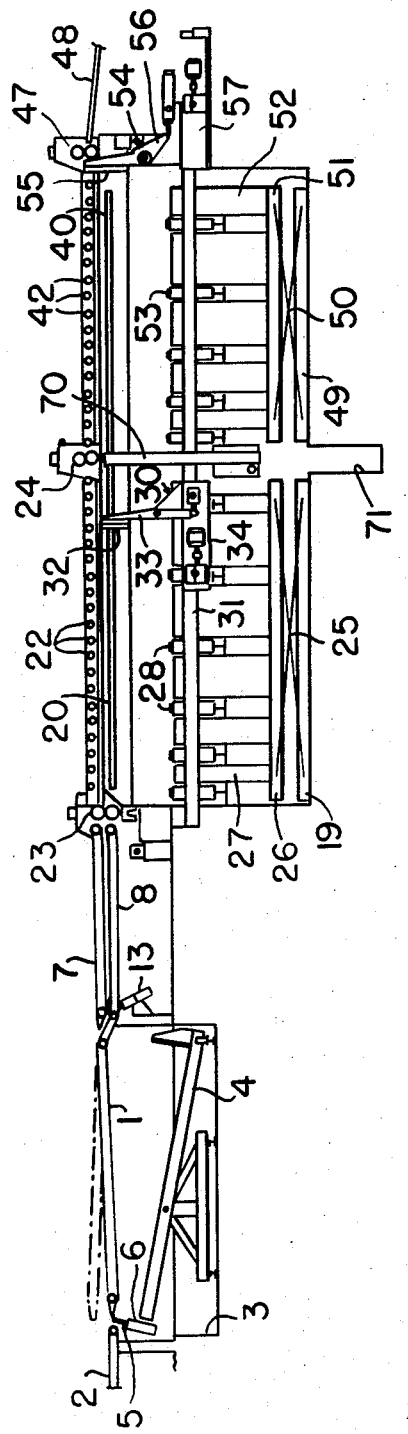
Figure 2:
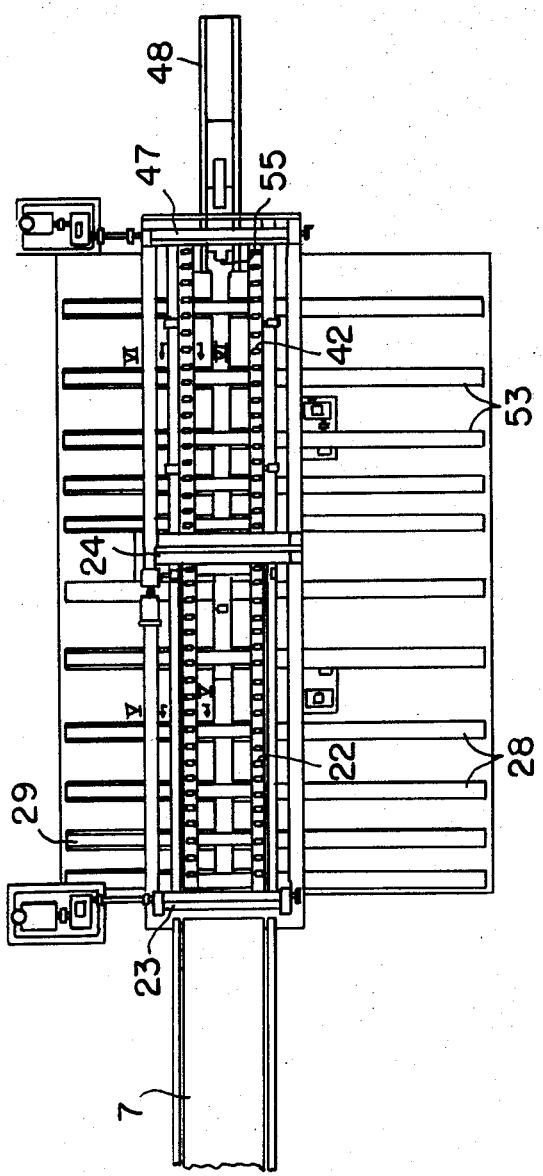
Figure 5:
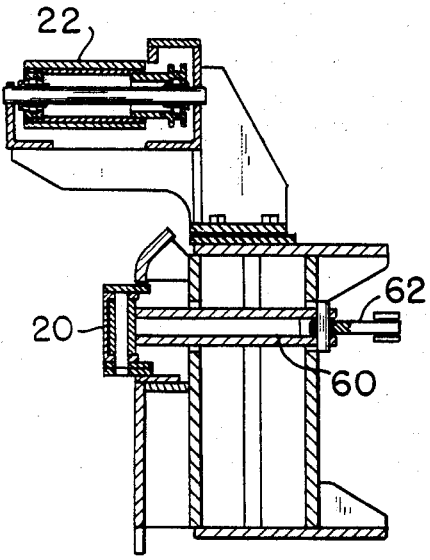
Figure 6:
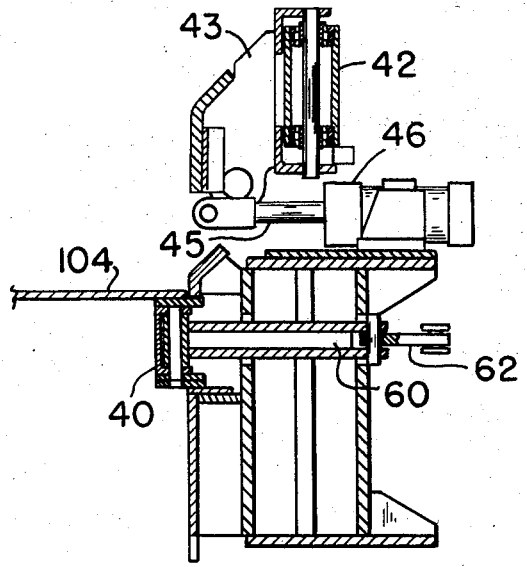
Figure 7:
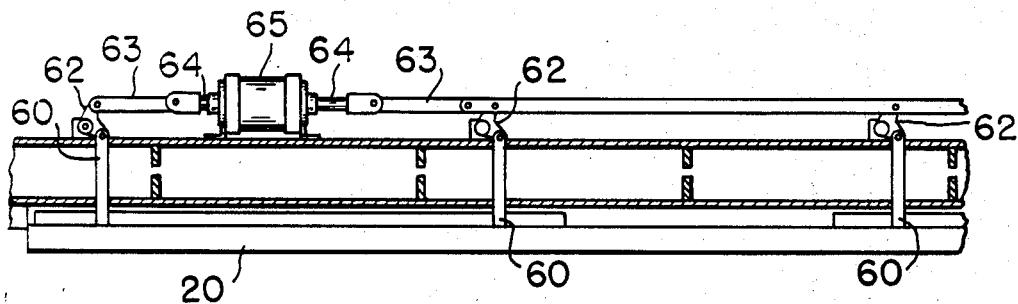
Figure 8:
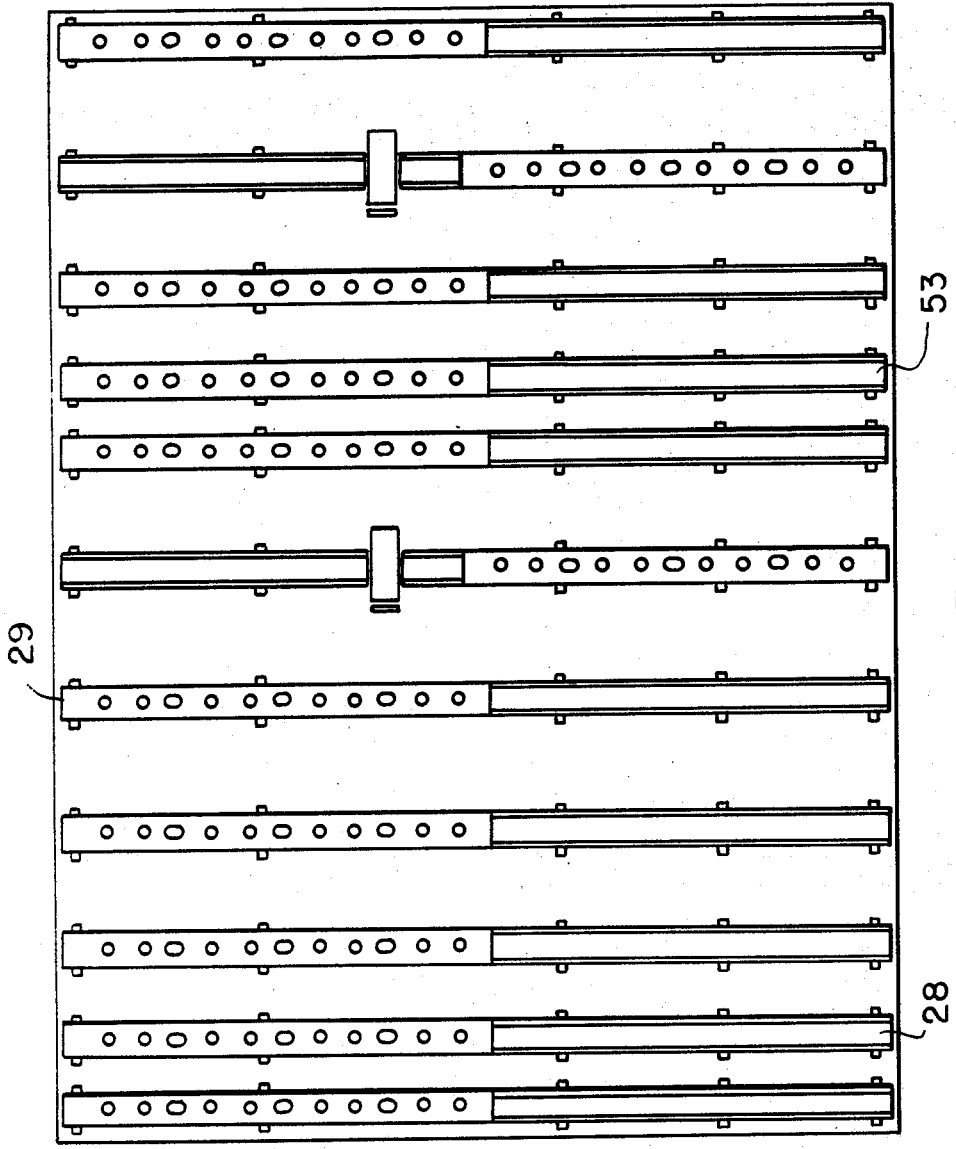
Figure 11:
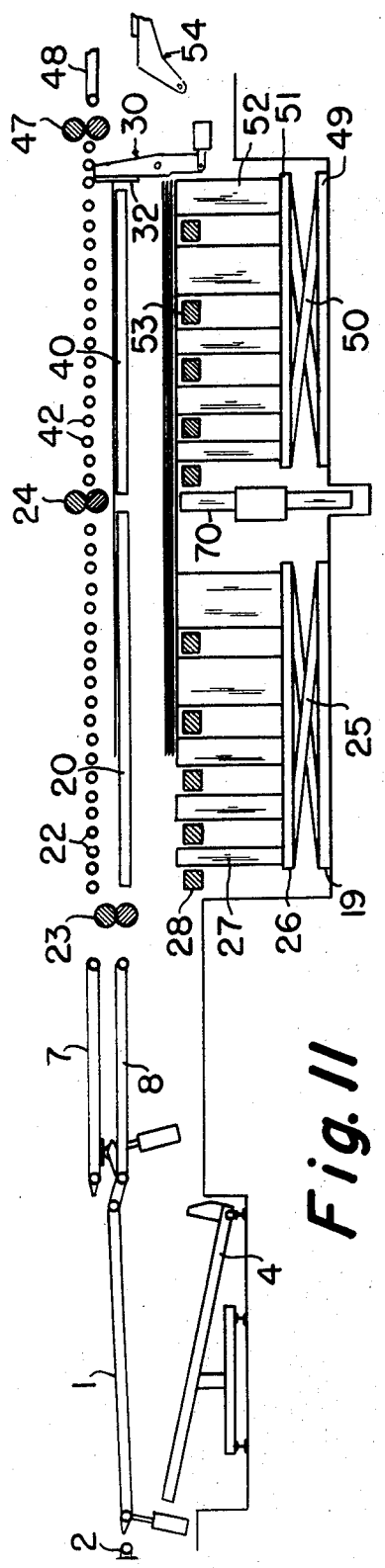
Figure 12:
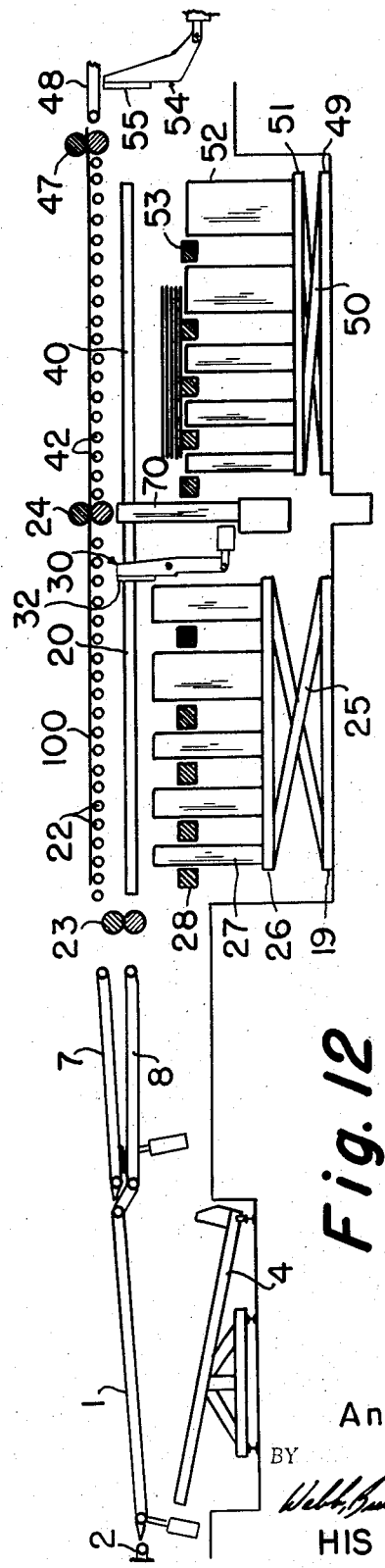

In the accompanying drawings, I have shown a preferred embodiment of the invention in which:

FIG. 1 is an elevation of the piling device and conveyers;
FIG. 2 is a plan view of the piling device with the supply conveyers broken away;
FIG. 3 is an elevation of the supply conveyers;
FIG. 4 is a broken-away elevation of the supply conveyers in an adjusted position;
FIG. 5 is a section on line V—V of FIG. 2;
FIG. 6 is a section on line VI—VI of FIG. 2 with the roller conveyer in the inoperative position;
FIG. 7 is a partial plan view showing the mechanism for retracting the runners;
FIG. 8 is a plan view of the assembly for removing piles of sheet from the elevators;
FIG. 9 is a schematic view showing the operation of the piling device utilizing the first piler for piling short sheets;
FIG. 10 is a schematic view showing the operation of the piling device untilizing the second piler for piling a second group of short sheets when the first piler is filled;
FIG. 11 is a schematic view showing the operation of the piling device utilizing both pilers as a unit for piling long sheets; and
FIG. 12 is a schematic view showing the manner in which a sheet longer than the piling device is bypassed.

Referring to FIGS. 1 and 2 of the drawings, the piling device consists of a conveyer section for supplying sheets to the pilers, a first piler for piling sheets of relatively short length and a second piler which may be used independently to pile sheets of relatively short length or in conjunction with the first piler to pile longer sheets. The conveyer section consists of an adjustable conveyer 1 which is aligned with the main conveyer 2. Conveyer 1 is located over a reject pit 3 containing a table 4 for receiving damaged sheets. The forward or entry end of conveyer 1 is raised relative to the exit end of conveyer 2 by rod 5 of cylinder 6 to permit damaged sheets to pass from conveyer 2 onto table 4. Assuming the sheet is not a reject, the entry end of conveyer 1 remains in the same plane as conveyer 2; and the sheet passes over the conveyer 1 onto upper conveyer 7 or lower conveyer 8 for transportation to the piling device. Conveyers 1, 2, 7 and 8 may be belt conveyers or roller conveyers, and the specific construction of these conveyers forms no part of the invention.

As shown in FIGS. 3 and 4 of the drawings, upper conveyer 7 is mounted so that the forward or entry end thereof can be raised relative to the forward end of lower conveyer 8 by means of rod 12 of a hydraulic cylinder 13 and arm 14. The arrangement of arm 14 makes it possible to align the exit end of conveyer 1 with the entry end of either conveyer 7 or conveyer 8. Arm 14 is mounted on the conveyer support frame by a pin 15 and one end of the rocker arm is pivotally attached to the exit end of conveyer 1 by a pin 16. The other end of arm 14 carries a contact roller 17 which contacts a wear plate on the bottom of conveyer 7 so that movement of rod 12 adjusts the position of the ends of conveyers 1 and 7. When rod 12 is in the retracted position as shown in FIG. 3, the entry end of conveyer 7 is aligned with the exit end of conveyer 1; and a sheet will pass from conveyer 1 onto conveyer 7 for transportation to the roller conveyer of the first piler. Alternatively, when rod 12 is extended as shown in FIG. 4, the exit end of conveyer 1 is in alignment with the entry end of conveyer 8; and a sheet will pass from conveyer 1 onto conveyer 8 for transportation to the first set of pinch rolls of the piling device.

The two pilers may be operated either independently or simultaneously as a unit in a manner explained hereinafter. The first piler includes opposed retractable runners 20 and 21 each of which is located below a set of driven rollers 22. The rollers are driven by a common motor and gear arrangement which form no part of my invention and are not described in detail herein. Pinch rolls 23 are located at the forward end of the first piler and are positioned to receive a sheet from conveyer 8 and pass it onto runners 20 and 21. A second set of pinch rolls 24 is located at the middle of the piling device between the individual pilers and is positioned to receive sheets traveling on rollers 22. An elevator 19 is located in the lower portion of the first piler and includes a scissors mechanism 25 of a well known design carrying a base 26 which supports lift members 27. The lift members receive sheets from runners 20 and 21 when they are retracted and lower the piles of sheets onto transverse carrier beams 28. Carrier beams 28 are mounted on wheels traveling along tracks 29, and each carrier beam may be raised slightly by an air cylinder so that it is disengaged from the drive piston which moves the beams and will remain in place while the engaged beams are moved. Tracks 29 extend at a right angle on both sides of the elevator. A bumper 30 is carried on parallel track members 31 which extend throughout the length of the piling device. The bumper consists of a contact member 32 on the upper end of a pivotally mounted arm 33 which is attached to a carriage 34 having wheels riding in track members 31. The contact member extends above the upper surfaces of runners 20 and 21 to contact sheets sliding on the runners.

As shown in FIGS. 1 and 2, the second piler of the piling device consists of retractable runners 40 and 41 aligned with runners 20 and 21. The leading ends of runners 40 and 41 are located closely adjacent to the trailing ends of runners 20 and 21, and each runner in the second piler is located below a a set of rollers 42. Rollers 42 are not driven and are carried in frames 43 which are pivotally mounted in the manner shown in FIG. 6 so that they can be rotated into a vertical position to permit access to runners 40 and 41. Each frame 43 is mounted on an elongated shaft for rotary movement, and a plurality of rods 45 are pivotally attached to the frame. Cylinders 46 extend rods 45 to rotate the frame about the elongated shaft into the vertical or inoperative position. A set of pinch rolls 47 is located at the exit end of the piling device and is positioned to receive sheets passing over rollers 42 and pass the sheets onto a ramp 48. An elevator 49 consisting of a scissors mechanism 50, a base 51 and lift members 52 is located in the lower portion of the second piler to lower piles of sheet onto transverse carrying beams 53. The tracks are parallel to tracks 29, and the carrier beams are independently operable in the same manner as beams 28. A bumper 54 having a contact member 55 on a pivoted arm 56 carried on a carriage 57 which is mounted on wheels for movement along track members 31 is located in the second piler. The contact member extends above the upper surfaces of runners 40 and 41.

Each of runners 20, 21, 40 and 41 is retracted by a rod and crank mechanism like that shown schematically in FIG. 7. The mechanism has a plurality of rods 60 extending through the frame, and the inner end of each rod is attached to a runner. The opposite end of each rod is attached to one arm of a bell crank member 62 pivotally mounted in an ear carried by the frame. The other arm of each bell crank member is attached to a shaft comprised of connected members 63, and members 63 are attached to rod 64 of cylinder 65. When members 63 are shifted to the left as seen in FIG. 7, rods 60 retract the runner toward the frame to permit a sheet supported thereon to drop onto the lift members of the elevator.

A vertically adjustable stop member 70 is located between the first and second pilers approximately below pinch rolls 24. The stop member prevents short sheets supplied to the second piler from sliding into the first piler. The stop member rides on rollers and may be lowered into recess 71 by a motor when the two pilers are used as a unit.

In the operation of my device, the position of the supply conveyers is determined by the length of the sheets and by the condition of the pilers. When the sheets passing from conveyer 2 onto conveyer 1 are extremely long and cannot be handled by the piling device, the entry end of conveyer 7 will be aligned with the exit end of conveyer 1 by adjustment of rod 12 and arm 14. The sheet then passes over conveyor 7 and over the upper roll of pinch rolls 23 onto driven rollers 22. The sheet is moved over the first piler by the driven rollers and passes through pinch rolls 24 onto rollers 42 of the second piler and through pinch rolls 47 onto ramp 48 at the exit end of the piling device. In this manner the sheet passes completely over the piling device without interruption. A schematic representation of the operation of the piling device when handling an extremely long sheet is shown in FIG. 12 of the drawings wherein the sheet is designated 100.

When a sheet having a length shorter than either individual piler is supplied to the piling device, it may be piled in either the first piler or the second piler depending upon which piler is empty. Assuming both pilers are empty, the sheets will be piled in the first piler until it is full and will be piled in the second piler while the pile is removed from the first piler. The operation of the piling device when handling relatively short sheets is shown schematically in FIGS. 9 and 10 of the drawings. When the first piler is empty, the entry end of conveyer 8 is aligned with the exit end of conveyer 1, and the sheets pass through pinch rolls 23 onto retractable runners 20 and 21 and contact adjustable bumper 30 which will be properly positioned along track members 31 so that the distance between contact member 32 and the entry end of the first piler is only slightly greater than the length of the sheets to be piled. Elevator 19 will be in the raised position to receive sheets from the runners, and the sheets will be deposited upon lift members 27 by retraction of runners 20 and 21. The elevator will be gradually lowered as more sheets are supplied to the piler; and when the piler is full, the pile will be removed by the carrier beams. In FIG. 9, a sheet 101 is shown in position on the carrier beams, and a sheet 102 is shown on the runners.

While a pile is being removed from the first piler on the carrier beams, the second piler may be used to stack relatively short sheets so that no interruption in the piling operation occurs. When the second piler is used for piling short sheets, the entry end of upper conveyer 7 is aligned with the exit end of conveyer 1, and the sheets are passed over the conveyers onto the driven rollers 22 of the first piler. The sheets pass along the driven rollers through pinch rolls 24 and drop downwardly onto retractable runners 40 and 41 located in the second piler. The rollers 42 of the second piler are in the retracted position shown in FIG. 6 during this operation. The sheets are deposited on the elevator and removed by carrier beams 53 in the same manner as in the first piler. The operation of the second piler is shown in FIG. 10 of the drawings wherein a plurality of sheets 103 is loacted on the elevator, and a sheet 104 is on the runners ready for deposit onto the pile. Bumper 30 is located in the second piler along track members 31 to provide a stop for the sheet. It is also possible to use bumper 54 in the second piler since it may be adjusted along track members 31. When the second piler is being used, the retractable stop member 70 will be in its upper position to provide a forward stop for the sheets so that they cannot slide into the first piler.

When the sheets to be stacked are longer than the individual pilers but shorter than the combined length of both pilers, the piling device will operate in the manner shown in FIG. 11. The retractable stop member 70 is in its inoperative position with its lower end extending into recess 71, and in this position its upper end is lower than the carrier beams. Bumper 30 is positioned along track 31 in accordance with the length of the sheet being piled. The sheets are supplied from conveyer 1 to conveyer 8 and pass through pinch rolls 23 onto runners 20 and 21 of the first piler. Since runners 20 and 21 are aligned with runners 40 and 41, the sheet will slide along runners 20 and 21 onto runners 40 and 41 in the second piler. The runners are then simultaneously retracted, and the sheets are deposited onto elevators 19 and 49 which are actuated simultaneously to lower the pile onto the carrier beams 28 and 53. The carrier beams are individually actuated so that only those beams supporting the pile are moved on the tracks to shift the pile from beneath the pilers.

Although the sheet piling device of my invention has been described herein in connection with the piling of pieces sheared from metal strip, it is readily apparent that the device may also be used to pile other flat articles such as for example plates, wallboard and plywood; and my invention is, therefore, not limited to the piling of sheets of metal strip.

I claim:

1. A device for piling sheets including conveyer means, a first piler located adjacent to said conveyer means, said first piler having a first pair of spaced parallel retractable runners extending throughout its length for receiving sheets from said conveyer means, a second piler located in tandem with said first piler and having a second pair of spaced parallel retractable runners extending throughout its length and aligned with the runners of said first pair of runners and without obstruction between said first and second pairs of runners, elevator means located below said runners having lift members adapted to receive sheets from said runners when said runners are retracted and transversely movable carrier means located below said lift members to receive sheets from said lift members when said elevator means is lowered, whereby sheets having a length greater than said first piler are received on said first and second pairs of runners and sheets are deposited from said runners onto said lift members by retraction of said runners and are placed on said carrier means by lowering said elevator means until said lift members are lower than said carrier beams.

2. A device as set forth in claim 1 wherein said conveyor means includes a first conveyor spaced from said first piler and a pair of conveyers between said first conveyer and said first piler, said pair of conveyers comprising a lower conveyer and an upper conveyer located above said lower conveyer, means for raising the entry end of said first conveyer to permit damaged sheets to pass thereunder and means for vertically adjusting the entry end of said upper conveyer and the exit end of said first conveyer to align the exit end of said first conveyer with the entry end of said lower conveyer and with the entry end of said upper conveyer to permit sheets to pass from said first conveyer to either said lower conveyer or said upper conveyer.

3. A device as set forth in claim 2 wherein said conveyers are supported on a frame, a rocker arm pivotally mounted at its center to said frame, said arm having a first end pivotally attached to the exit end of said first conveyer and a second end carrying a roller member in contact with the lower surface of said upper conveyer adjacent the entry end thereof, means attached to said arm for rotating said arm about said mounting pivot to move the exit end of said first conveyer and the entry end of said upper conveyer relative to said frame, whereby rotation of said arm in one direction raises the entry end of said upper conveyer and lowers the exit end of said first conveyer to align said first and lower conveyers and rotation of said arm in the other direction raises the exit end of said first conveyer and lowers the entry end of said upper conveyer to align said first and upper conveyers.

4. A device as set forth in claim 1 wherein said first piler includes conveyer means having driven rollers located above said first pair of runners and a first set of pinch rolls located at the entry end of said first piler and positioned with the top of the upper roll in alignment with the rollers of said conveyer means and with the top of the lower roll in alignment with the runners of said first pair of runners, and said conveyer means include an adjustable upper conveyer having its exit end aligned with the top of the upper roll of said set of pinch rolls and a lower conveyer having its exit end aligned with the top of the lower roll of said set of pinch rolls, whereby sheets passing over said adjustable upper conveyer are supplied to said conveyer means and sheets passing over said lower conveyer are supplied between said pinch rolls to said first pair of runners.

5. A device a set forth in claim 4 including a vertical stop member located between said first and second pilers, said stop member being mounted for vertical adjustment relative to the upper surfaces of runners so that when said stop member is in its upper position it extends above the upper surfaces of said runners to prevent sheets being piled in said second piler from sliding into said first piler and when it is in its lower position it is below the upper surfaces of said runners to permit said first and second pilers to be used simultaneously.

6. A device as set forth in claim 4 wherein said second piler includes conveyer means located above said second pair of runners, and a second set of pinch rolls is located between said first and second pilers, the top of the lower roll of said second set of pinch rolls being aligned with said conveyer means of said first and second pilers, whereby sheets passing through said second set of pinch rolls pass from the conveyer means of said first piler to the conveyer means of said second piler.

7. A device as set forth in claim 6 including a third set of pinch rolls located at the exit end of said second piler, the top of the lower roll of said third set of pinch rolls being aligned with said conveyer means of said second piler and a ramp immediately behind said second piler, whereby sheets passing over said conveyer means of said second piler pass through said third set of pinch rolls onto said ramp.

8. A device as set forth in claim 6 wherein the conveyer means of said second piler comprises a first row of rollers mounted in a frame located over one runner of said second pair of runners and a second row of rollers mounted in a frame located over the other runner of said second pair of runners and means mounting said frames for rotation from a horizontal position into a vertical position, whereby said rollers are in the horizontal position to receive sheets which are too long to be piled in said second piler and are rotated into the vertical position to permit sheets to pass to said runners of said second pair of runners.

9. A device as set forth in claim 1 including a pair of parallel track members located below said runners and extending throughout the length of said first and second pilers, a carriage mounted on said track members for movement therealong, an arm pivotally attached to said carriage, said arm carrying a contact member at its upper end and said contact member adapted to extend above the upper surfaces of said runners to contact sheets sliding on said runners.

10. A device as set forth in claim 1 wherein each of said ing on said runners, whereby said contact member can be positioned along said track members longitudinally of said first and second pilers to stop movement of sheets sliding runners is retracted by a plurality of laterally extending rods having one end attached to said runner and the other end attached to an actuator member, each of said actuator members being operated by power means to move said rods and retract said runners.

11. A device as set forth in claim 1 including a longitudinal track member extending throughout the lengths of said first and second pilers, said track member supporting a first carriage and a second carriage for movement therealong, each of said carriages having a contact member adjustably attached thereto, said contact members adapted to extend above the upper surfaces of said runners in a first position and to be below the upper surfaces of said runners in a second position, whereby sheets sliding along said runners contact said contact members and are stopped when said contact members are in said first position.

12. In combination with means for moving sheets, a device for piling sheets, said device including a first piler and a second piler in tandem with said first piler, said first piler having a pair of spaced parallel retractable runners and having means located above said runners for bypassing sheets over said first piler, said second piler having a pair of spaced parallel retractable runners aligned with the runners of said first piler and having adjustable means for bypassing sheets over said runners, said means for moving sheets being adjustable to supply sheets to said bypassing means or to said runners and means for removing sheets from said pilers, whereby long sheets are supplied to said bypassing mean to bypass said piling device and sheets of a length to be handled by said pilers are supplied to said runners to be piled.

13. A device as set forth in claim 12 including a first set of pinch rolls located between said adjustable supply means and said first piler and aligned with the runners of said first piler, a second set of pinch rolls located between said first and second pilers and a third set of pinch rolls located at the exit end of said second piler, said second and third sets of pinch rolls being aligned with said bypassing means and a ramp located immediately behind said third set of pinch rolls to receive sheets passing therethrough, whereby sheets passing through said first set of pinch rolls are supplied to said runners and sheets supplied to said bypassing means of said first piler pass through said second and third sets of pinch rolls onto said ramp to bypass said piling device.

References Cited
UNITED STATES PATENTS 2,497,149    2/1950    Berdis.
3,288,312    11/1966    Hughes _____ 271—86 X M. HENSON WOOD, Jr., Primary Examiner R. A. SCHACHER, Assistant Examiner U.S. Cl. X.R.

209—82; 125; 271—88

PO-1050
(5/69)

UNITED STATES PATENT OFFICE
CERTIFICATE OF CORRECTION

Patent No. 3,471,142      Dated October 7, 1969

Inventor(s) Andre Bergez

It is certified that error appears in the above-identified patent and that said Letters Patent are hereby corrected as shown below:

Column 1, line 52 "or" should read "of". Column 2, line 20, "untilizing" should read "utilizing". In Claim 9, Column 6, line 61, after "slid-" insert "ing on said runners, whereby said contact member can be positioned along said track members longitudinally of said first and second pilers to stop movement of sheets sliding". In Claim 1 Column 6, delete lines 64, 65 and 66. In Claim 12, Column 7, line 20, "mean" should read "means".

SIGNED AND
SEALED
MAY 12 1970

(SEAL)
Attest:

Edward M. Fletcher, Jr.
Attesting Officer

WILLIAM E. SCHUYLER, JR.
Commissioner of Patents